(12) United States Patent
Al Faruque et al.

(10) Patent No.: US 10,212,185 B1
(45) Date of Patent: Feb. 19, 2019

(54) DEFENDING SIDE CHANNEL ATTACKS IN ADDITIVE MANUFACTURING SYSTEMS

(71) Applicant: The Regents of the University of California, Oakland, CA (US)

(72) Inventors: Mohammad Abdullah Al Faruque, Irvine, CA (US); Jiang Wan, Irvine, CA (US); Sujit Rokka Chhetri, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 71 days.

(21) Appl. No.: 15/438,997

(22) Filed: Feb. 22, 2017

Related U.S. Application Data (60) Provisional application No. 62/298,091, filed on Feb. 22, 2016.

(51) Int. Cl.
H04L 29/06 (2006.01)

(52) U.S. Cl.
CPC ...... H04L 63/1433 (2013.01); H04L 63/1466 (2013.01)

(58) Field of Classification Search
CPC ............... G06F 21/577; H04L 63/1433; H04L 63/1416; H04L 63/1466; H04L 63/20; H04L 63/1408
USPC ........................................................ 726/25
See application file for complete search history.

(56) References Cited

U.S. PATENT DOCUMENTS

| | | | | |
|---|---|---|---|---|
| 5,933,353 A * | 8/1999 | Abriam | ............ | G05B 19/4097 700/171 |
| 2009/0013689 A1* | 1/2009 | Sumser | ................ | F01D 9/026 60/605.1 |
| 2009/0306802 A1* | 12/2009 | Cone | .................... | G06F 17/5004 700/98 |
| 2013/0150994 A1* | 6/2013 | Barbir | ............... | G05B 19/4099 700/98 |
| 2014/0288893 A1* | 9/2014 | Blom | .................. | G06F 17/5018 703/1 |
| 2015/0217520 A1* | 8/2015 | Karpas | ............... | B29C 67/0055 700/98 |
| 2016/0176117 A1* | 6/2016 | Lee | .................... | G05B 19/4099 700/98 |
| 2017/0203515 A1* | 7/2017 | Bennett | ............... | B29C 67/0088 |
| 2017/0286567 A1* | 10/2017 | Hana | ..................... | G06T 17/20 |

(Continued)

OTHER PUBLICATIONS

J. Lee, et al., "A cyber-physical systems architecture for industry 4.0-based manufacturing systems," Manufacturing Letters, 2015.

(Continued)

*Primary Examiner* — Farid Homayounmehr
*Assistant Examiner* — Sanchit K Sarker
(74) *Attorney, Agent, or Firm* — Nguyen & Tarbet Law Firm (57) ABSTRACT

A novel methodology for providing security to maintain the confidentiality of additive manufacturing systems during the cyber-physical manufacturing process is featured. This solution is incorporated within the computer aided manufacturing tools such as slicing algorithms and the tool-path generation, which are in the cyber-domain. This effectively mitigates the cross domain physical-to-cyber domain attacks which can breach the confidentiality of the manufacturing system to leak valuable intellectual properties.

8 Claims, 9 Drawing Sheets

(56) References Cited

U.S. PATENT DOCUMENTS

| | | | |
|---|---|---|---|
| 2018/0033105 A1* | 2/2018 | Tanaka | G06Q 30/06 |
| 2018/0104743 A1* | 4/2018 | Horst | B29C 67/0088 |

OTHER PUBLICATIONS

P. Daugherty, P. Banerjee, et al., "Driving unconventional growth through the industrial internet of things," New York: Accenture, 2014.

J. Wan et al., "Security-aware functional modeling of cyber-physical systems," in 20th Conference on Emerging Technologies & Factory Automation (ETFA), IEEE, 2015.

"IBM Cyber Security Intelligence Index." IBM., 2016.

H. Lasi, P. Fettke, et al., "Industry 4.0," Business & Information Systems Engineering, vol. 6, No. 4, p. 239, 2014.

Gibson, D.W. Rosen, et al., Additive manufacturing technologies, vol. 238. Springer, 2010.

M. Hvistendahl, "3d printers vulnerable to spying," Science, vol. 352, No. 6282, pp. 132-133, 2016.

M. Yampolskiy et al., "Intellectual property protection in additive layer manufacturing: Requirements for secure outsourcing," ACM, 2014.

T. Harte and A.G. Bors, "Watermarking 3D models," in International Conference on Image Processing, IEEE, 2002.

R. Ohbuchi et al., "Watermarking three-dimensional polygonal models through geometric and topological modifications," IEEE Journal on selected areas in communications, 1998.

F. Ghilassene, "3D printing and IP rights: some issues, any solutions?" Paris Tech review, 2014.

W. Ashford, "21 percent of manufacturers hit by intellectual property theft," Aug. 2014.

M.A. Al Faruque, S. Rokka Chhetri, et al., "Acoustic side-channel attacks on additive manufacturing systems," in International Conference on Cyber-Physical Systems (ICCPS), IEEE, 2016.

S. Rokka Chhetri, A. Canedo, and M.A. Al Faruque, "Kcad: kinetic cyber-attack detection method for cyber-physical additive manufacturing systems," in Proceedings of the 35th International Conference on Computer-Aided Design, ACM, 2016.

R. Akella, H. Tang, et al., "Analysis of information flow security in cyber-physical systems," International Journal of Critical Infrastructure Protection, vol. 3, No. 3, pp. 157-173, 2010.

F.X. Standaert et al., "A unified framework for the analysis of side-channel key recovery attacks," in Conference on the Theory and Applications of Cryptographic Techniques, Springer, 2009.

R. Jamieson and H. Hacker, "Direct slicing of cad models for rapid prototyping," Rapid Prototyping Journal, vol. 1, No. 2, pp. 4-12, 1995.

G. Jin, W. Li, et al., "Adaptive tool-path generation of rapid prototyping for complex product models," Journal of manufacturing systems, vol. 30, No. 3, pp. 154-164, 2011.

H.S. Kim and L.W. Tsai, "Design optimization of a cartesian parallel manipulator," Journal of Mechanical Design, 2003.

P. Sanchez-Sanchez and F. Reyes-Cortes, Cartesian Control for Robot Manipulators. INTECH Open Access Publisher, 2010.

A.J. Ellison and S. Yang, "Natural frequencies of stators of small electric machines," Proceedings of the Institution of Electrical Engineers, vol. 118, No. 1, pp. 185-190, 1971.

J. Plunt, "Finding and fixing vehicle NVH problems with transfer path analysis," Sound and vibration, vol. 39, No. 11, pp. 12-17, 2005.

B. Drumm, "Printrbot: Your first 3d printer," Retrieved November, vol. 26, p. 2013, 2011.

"AT2021 Cardioid Condenser Microphone." Audio-Technica, 2016.

Evans, Peter C., and Marco Annunziata. "Industrial internet: Pushing the boundaries of minds and machines." General Electric 21, 2012.

Bradshaw, Simon, Adrian Bowyer, and Patrick Haufe. "The intellectual property implications of low-cost 3D printing." ScriptEd 7.1: 5-31, 2010.

Jones, Rhys, et al. "RepRap—the replicating rapid prototyper." Robotica, 2011.

Whitehouse, "Administration strategy on mitigating the theft of U.S. trade secrets", https://www.whitehouse.gov/sites/default/files/omb/IPEC/admin_strategy_on_mitigating_the_theft_of_u.s_trade_secrets.pdf, 2013.

* cited by examiner

KEY
(i) X-axis (blue)
(ii) Y-axis (green)
(iii) Z-axis (red)

KEY
(i) X-axis (blue)
(ii) Y-axis (green)
(iii) Z-axis (red)

DEFENDING SIDE CHANNEL ATTACKS IN ADDITIVE MANUFACTURING SYSTEMS

CROSS REFERENCE

This application claims priority to U.S. Patent Application No. 62/298,091, filed Feb. 22, 2016, the specification(s) of which is/are incorporated herein in their entirety by reference.

GOVERNMENT SUPPORT

This invention was made with government support under Grant No. CNS 1546993 awarded by NSF. The government has certain rights in the invention.

FIELD OF THE INVENTION

The present invention relates to cyber-physical additive manufacturing ("AM") systems, more specifically, to providing defense of intellectual property in the cyber domain of an AM system by encrypting analog emissions produced in the physical domain.

BACKGROUND OF THE INVENTION

Cyber-physical additive manufacturing systems have a tight integration between cyber and physical domains. This results in new cross-domain vulnerabilities that pose unique security challenges. One of the challenges is preventing confidentiality breach due to physical-to-cyber domain attacks, where attackers can analyze various analog emissions from the side-channels to steal the cyber-domain information. This information theft is based on the idea that an attacker can accurately estimate the relation between the analog emissions (acoustics, power, electromagnetic emissions, etc.) and the cyber-domain data (such as G-code). To obstruct this estimation process, it is crucial to quantize the relation between the analog emissions and the cyber-data, and use it as a metric to generate computer aided manufacturing tools, such as slicing and tool-path generation algorithms, that are aware of these information leakage through the side-channels.

In order to tackle this inevitable security issue of confidentiality breach in cyber-physical AM systems, researchers have focused on various security solutions. Some of the solutions involved are encryption and decryption of the cyber-data being sent to the manufacturer, watermarking of the 3D object and the manufacturing process, etc. Most of the research work in the art is focused on protecting the intellectual property ("IP") of the product after it has been built. However, there remains a presence of a persistent threat to the confidentiality of the system during the manufacturing process as well. Maintaining confidentiality during the manufacturing process might be more crucial due to the fact that these AM systems are extensively used for rapid-prototyping, and information leaked during this stage can cause the company to permanently lose its IP. In addition, researchers have recently shown that acoustic emissions from an AM system, such as 3D printers, reveal various design parameters of the 3D objects they produce. Therefore, it is imperative to analyze various analog emissions from different side-channels (such as acoustics, power, electromagnetic, etc.), and protect the system from physical-to-cyber-domain attacks during the manufacturing process.

Figure 8A:
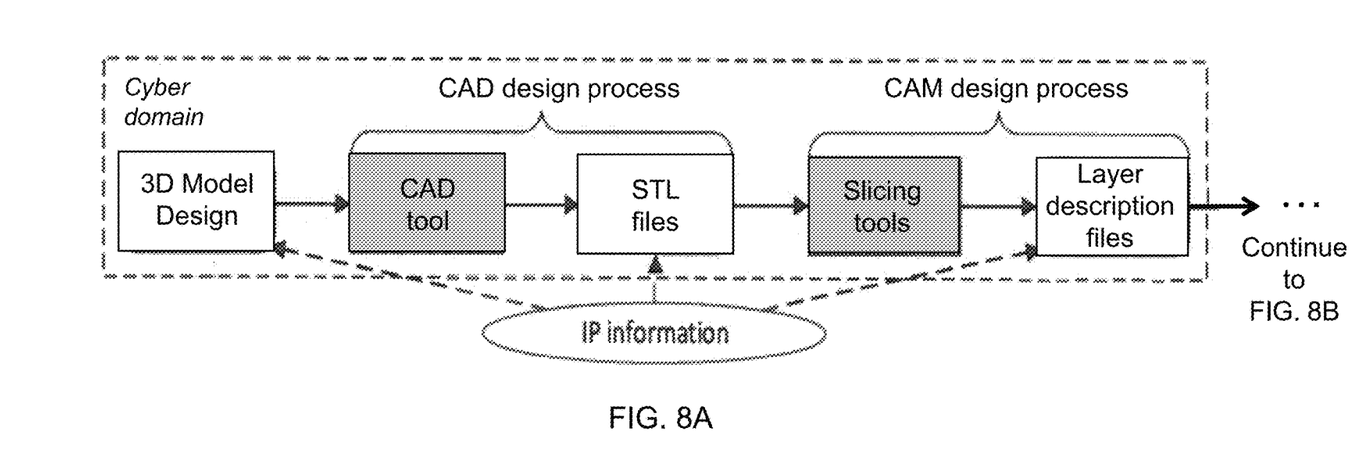
FIGS. 8A-8B shows areas of possible physical attacks during the lifecycle of the cyber-physical AM system.
Figure 8B:
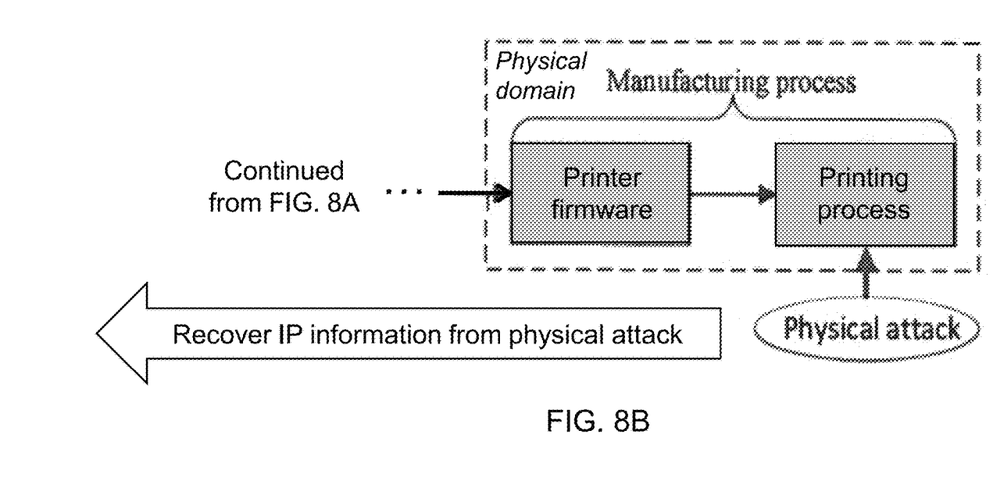

It has been well established that in cyber-physical systems ("CPS"), various physical components divulge information due to the observability of their physical actions. Moreover, these physical actions have the tendency to unintentionally leak information about the cyber-domain from the side-channels. Side-channels have been previously used in crypt-analysis to determine the secret key by utilizing the analog emissions leaked from the physical implementation of a cryptosystem rather than using the brute force or theoretical weakness of the algorithms. The digital process chain of additive manufacturing consists of Computer Aided Design (CAD) tools for modeling 3D objects, and Computer Aided Manufacturing (CAM) tools for converting 3D models to slices of 2D polygons, and then generating tool-path (G/M-codes) based on those 2D polygons (FIG. 8A-8B). These G/M-codes (cyber-data) are eventually converted to control signals that actuate the physical components. During actuation, mechanical and electrical energies flow through the system, and may leak the information about the G/M-codes (cyber-data).

The present invention features a system and methodology that uses mutual information as a metric to quantize the information leakage from the side-channels, and demonstrates how various design variables (such as object orientation, nozzle velocity, etc.,) can be used in an optimization algorithm to minimize the information leakage. The present methodology integrates this leakage aware algorithm to the state-of-the-art slicing and tool-path generation algorithms and achieves 24.76% average drop in the information leakage through an acoustic side-channel.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

To address the above mentioned challenges, a novel system and methodology are proposed that are capable of generating information leakage aware secured cyber-physical additive manufacturing tools that employs:
1) Leakage modeling of the AM system, which incorporates a physics-based leakage model to understand the mechanical and electrical source of information leakage, estimates a data-driven leakage model to ease the leakage modeling, and performs information quantification using mutual information; and
2) Formulation of an Optimization Problem that describes various design variables (orientation, θ, and travel feed-rate, v) to optimize, and provides these optimized values as an input to the slicing algorithm and the tool-path generation algorithm in the digital process chain of the AM system.

Currently existing systems and methodologies have inherent limitations, more specifically, current research work focuses on protecting the intellectual property of the AM system after it has been built, and as such they cannot protect the confidentiality of the AM system during the manufacturing process.

The present invention is capable of protecting the confidentiality of the AM system during the manufacturing process by optimizing design variables using mutual information between a design variable and a corresponding analog emission as feedback into the AM system. In one embodiment, the present invention includes the following non-limiting inventive features to accomplish said optimization:

- a data-driven leakage model of a manufacturing machine integrated into the AM system, where the leakage model determines which design variable to optimize for a specific side channel based on a relation between the G-code and the information leakage;
- deriving a mutual information metric between the G-code and the information leakage for each design variable, and
- deriving a relation between the mutual information metric and each design variable defined in the G-code; and
- calculating an optimized value for each design variable and inserting the optimized value of each design variable into the G-code, where further information leakage is minimized when the G-code is executed.

According to some embodiments, the present invention features systems and methods of reducing an information leakage from one or more side channels of an additive manufacturing ("AM") system. The AM system may comprise a manufacturing machine that prints a 3D model by executing a G-code having a plurality of design variables. In one embodiment, the information leakage comprises analog emissions emanating from the one or more side channels during printing of the 3D model, and an attacker acquires and analyzes the information leakage to extract the G-code. In some embodiments, the system may comprise a processor operatively coupled to the manufacturing machine, and a memory operatively coupled to the processor, configured to store digitally-encoded instructions that, when executed by processor, cause the processor to perform operations. These operations can be the steps of said method.

In one embodiments, the operations may comprise determining an estimation function, f', from a data-driven leakage model of the manufacturing machine (106) for each design variable, wherein the manufacturing machine is initially ran to print a sample 3D model, thereby acquiring the analog emissions from the one or more side channels, wherein the estimation function f' provides a relationship between each design variable and a corresponding analog emission, wherein the estimation function f' is determined by a statistical tool that compares each design variable to the corresponding analog emission; selecting, from the plurality of design variables, one or more design variables to optimize for the one or more side channels; calculating a mutual information metric between the G-code and the information leakage for each of the one or more selected design variables, wherein the mutual information metric is used as feedback by the AM system to optimize the one or more selected design variables to effectively minimize further information leakage, wherein the information leakage is represented by a leakage signal L at side channel i as: $L_i = \delta_i(G) + N_i$, where i=1 to total number of side channels, where $N_i$ denotes independent noise in channel i, G is the G-code comprising a set $(g_1, g_2, \ldots g_k)$ of length k, where each g in the set is a discrete random variable that represents a possible G-code instruction, and $\delta_i(G)$ represents a deterministic function, wherein the mutual information metric between the G-code and the information leakage in side channel i is calculated for each of the one or more selected design variables as:

$$I(G; L_i) = \sum_{l_i \in L_i} \sum_{g \in G} p(g, l_i) \log_2\left(\frac{p(g, l_i)}{p(g)p(l_i)}\right),$$

wherein l is a corresponding leakage of g, and p is a probability distribution function, wherein $p(g, l_i)$ is estimated by the estimation function f' for each of the one or more selected design variables; calculating a relation between the mutual information metric and each of the one or more selected design variables using a non-linear polynomial function, f, given as: f (selected design variable) =summation of $(I_i)$; obtaining an optimized value from f for each of the one or more selected design variables; and inserting the optimized value of each of the one or more selected design variables into the G-code, thereby replacing a current value of each of the one or more selected design variables with the optimized value.

Without wishing to limit the invention to a particular theory or mechanism, when the optimized value of each of the one or more selected design variables is inserted into the G-code, further information leakage from the one or more side channels is minimized, thus diminishing the attacker's ability to process the analog emissions and extract the G-code.

In some embodiments, the operations may further comprise constructing the data-driven leakage model of the manufacturing machine. In other embodiments, the operations may further comprise designating a user defined range for each of the one or more selected design variables, wherein the mutual information metric is calculated for a plurality of possible values within the user defined range. In still other embodiments, the optimized value can be obtained by selecting a corresponding minimum f for each of the one or more selected design variables.

According to yet another embodiment, the present invention features a physical process encryption system for defending an additive manufacturing ("AM") system against a side channel attack. The AM system may comprise a cyber domain and a physical domain having a manufacturing machine. The encryption system can be machine-dependent, and the data of the cyber domain can comprise G-code as input to the manufacturing machine. The G-code can comprise lines of code providing a layer-by-layer description of a 3D model to be printed by the machine via a printing process. In one embodiment, the side channel attack occurs when an attacker acquires analog emissions emanating from the machine during the printing process to extract the G-code and reproduce the 3D model.

In one embodiment, the encryption system may comprise a random pattern generator having an output, wherein the output comprises a plurality of random patterns that are machine-dependent redundant physical information; a physical process encryption module, operatively coupled to the random pattern generator; and a printer controller operatively coupled to the physical process encryption module. In some embodiments, the physical process encryption module uses the output of the random pattern generator to encrypt the physical printing process. In one embodiment, the physical process encryption module may comprise a memory storing a plurality of encryption schemes; and a processor, operatively coupled to the memory, configured to use the output of the random pattern generator to execute the plurality of encryption schemes to accomplish encryption of the physical printing process.

In some embodiments, the G-code is passed from the cyber domain to the physical process encryption module, where the plurality of random patterns are passed from the random pattern generator to the physical process encryption module, which then encrypts the physical printing process by embedding the plurality of random patterns into the G-code according to an encryption scheme. The G-code may then be transmitted to the printer controller for execution. Without wishing to limit the invention to particular theory or mechanism, as the G-code is executed, the resulting analog emissions are altered according to the machine-dependent redundant physical information embedded, thus encrypting the physical printing process and rendering G-code extracted using the altered analog emissions by the attacker ineffective for reproducing the 3D model.

In some embodiments, the machine-dependent redundant physical information embedded into the G-code comprises a plurality of random delays. Each random delay may be added in between lines of code of the G-code, and upon execution of the G-code, altered analog emissions emanate from the machine as a result of the random delays.

In other embodiments, the encryption system may further comprise one or more stepper motors, each operatively coupled to the physical process encryption module and the printer controller. The machine-dependent redundant physical information embedded into the G-code may comprise a randomization of a movement of each stepper motor, wherein each randomization generates random noise, thereby altering analog emissions emanating from the machine.

BRIEF DESCRIPTION OF THE DRAWINGS

The features and advantages of the present invention will become apparent from a consideration of the following detailed description presented in connection with the accompanying drawings in which.

DEFINITIONS

As used herein, the term "additive manufacturing" refers to a process in which a 3D object is printed in successive layers of materials by a manufacturing machine (e.g. a 3D printer).

As used herein, the term "G-code" is defined as a computer language comprising lines of code representing a layer-by-layer description of the 3D object. The G-code also defines a plurality of design variables each providing specific information (e.g. orientation of the 3D object, nozzle velocity etc.) to guide the manufacturing machine during the printing process.

As used herein, the term "M-code" is defined as a computer language comprising lines of code representing a layer-by-layer description of the 3D object. The M-code also defines a plurality of design variables each providing specific information to guide the manufacturing machine during the printing process. G-code and M-code are two coding types that perform the same function.

As used herein, the term "analog emissions" refers to the physical signals (e.g. power, electromagnetic, thermal, and acoustic emissions) produced by the manufacturing machine during the process of printing a 3D object.

As used herein, the term "information leakage" is synonymous to the term analog emissions. The latter is used to highlight the physical information emanating from the manufacturing machine. The former is used to highlight that this physical information is accessible to an attacker, hence, a leak of information or "information leakage." The attacker may analyze the information leakage (or, interchangeably, the analog emissions) to extract the G-code.

As used herein, the term "side-channel" refers to the physical source of an analog emission.

As used herein, the term "mutual information" is defined as an estimation of the relationship between an analog emission and the G-code instruction(s) whose execution produces the emission.

As used herein, "f(.)" identifies function f operating on any acceptable or inferred input.

DETAILED DESCRIPTION OF THE INVENTION

I. Information Leakage Aware Secured Cyber-Physical Method

Referring now to FIGS. 1-9, the present invention features a method for using mutual information as a metric ("mutual information metric") to quantize an information leakage from a side channel of an additive manufacturing ("AM") system. The AM system comprises a manufacturing machine (106) that prints a 3D model by executing a G-code, a layer-by-layer description of the 3D model. An information leakage results from analog emissions that emanate from side channels of the machine (106) during printing of the 3D model. An attacker may acquire and analyze the information leakage to extract the G-code. In the present method, the mutual information metric is used as feedback by the AM system for optimizing one or more design variables defined in the G-code to effectively minimize further information leakage. In some embodiments, the method may comprise constructing a data-driven leakage model of the machine (106) comprising the AM system (200). The leakage model may determine which design variable(s) to optimize for a specific side channel based on the relationship between the G-code and the information leakage.

In further embodiments, the mutual information metric (203) between the G-code and the information leakage may be calculated for each design variable. The information leakage may be represented by a leakage signal L at side channel i as: $L_i = \delta_i(G) + N_i$, where $i = 1, 2, \ldots$ total number of side channels, where $N_i$ denotes independent noise in channel i, G is the G-code comprising a set $(g_1, g_2, \ldots g_k)$ of length k, where each g in the set is a discrete random variable that represents a possible G-code instruction, and $\delta_i(G)$ represents a deterministic function. Additionally, the mutual information metric between the G-code and the information leakage in channel i may be calculated for each design variable as, $$I(G; L_i) = \sum_{l_i \in L_i} \sum_{g \in G} p(g, l_i) \log_2\left(\frac{p(g, l_i)}{p(g)p(l_i)}\right),$$

where l is a corresponding leakage of g, p is a probability distribution function, and $p(g, l_i)$ is estimated by an estimation function f' for each design variable. f' describes the relationship between each design variable and the information leakage and is acquired via the data-driven leakage model (201). The mutual information metric may be calculated for a plurality of possible values within a user defined range for each design variable (202).

In additional embodiments, a relation between the mutual information metric (203) and each design variable is calculated using a non-linear polynomial function, f, given as, f (design variable)=summation of $(I_i)$. An optimized value for each design variable (205) may then be obtained by selecting a corresponding minimum f (204) for each design variable. The optimized value of each design variable may then be inserted into the G-code. Applying the optimized values of design variables minimizes further information leakage, thus diminishing the attacker's ability to process the analog emissions and extract the G-code.

Leakage Modeling of the AM Security Method

The methodology proposed for security aware computer aided manufacturing ("CAM") tools is general, however, the solution provided by the optimization problem depends on the leakage model, and is machine specific. This is due to the fact that the side-channel leakage relies on a physical implementation of the system, and there are various types of cyber-physical manufacturing machines. In the present methodology, a physics-based leakage modeling of the system is used to understand the relation between the G/M-code and the analog emissions introduced in the side-channel. This understanding aides in determining the design variables to optimize for the specific side-channel. The leakage model is then used to quantify the information leakage, and provide it as a feedback to the optimization algorithm. However, physics-based models become complicated for complex manufacturing systems. Hence, data-driven leakage modeling was also performed to efficiently estimate the leakage model. The present methodology considers emissions of a Fused-Deposition Modeling (FDM) based AM system (also known as 3D printers) from an acoustic side-channel to determine the design variables for the optimization problem. The efficiency of the optimization algorithm in reducing the mutual information, and hence the information leakage from the acoustic side-channel, is demonstrated.

A. Physics-Based Leakage Model

A 3D printer may be considered as a cartesian robot. The physical modeling of the kinematics of the cartesian robot have been extensively explored. Based on these modeling, the dynamic response of the 3D printer may be calculated. Apart from the vibration from the dynamic response of the 3D printer, the stepper motors present in the 3D printer vibrate based on the current supplied to its winding. Hence, the electro-mechanical leakage model of the 3D printer is also presented.

1) Dynamic Model of the 3D Printer

Figure 1:
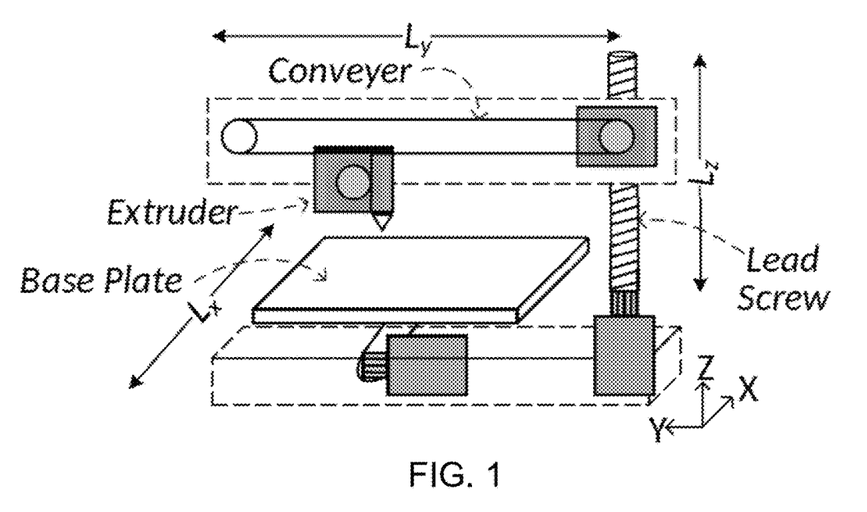
FIG. 1 shows a simplified mechanical structure of a 3D printer.

A simplified diagram of the state-of-the-art desktop 3D printer is shown in FIG. 1. It has three Degrees Of Freedom (DOF) for the extruder. There are three stepper motors that move the nozzle in the corresponding axis. The extruder consists of a stepper motor that pushes the thermo-plastic through the heating filament present in the nozzle. 3D printers realize the three DOF in various ways. Considering the nozzle as the end-effector, and the base plate as a point of reference, the 3D printer has three kinematic chains, each having a prismatic actuator (stepper motors). The generalized position of the end-effector may be defined as $q=[q_x, q_y, q_z]$, where $q \in \Re^{n \times 1}$, and $q_x$, $q_y$, $q_z$ are the joint position of each of the joints (x, y, and z axis). Since the joint is prismatic, $q_{i \in (x,y,z)}=d_i$, where $d_i$ corresponds to displacement of the joint in each axis. The end-effector cartesian coordinate (x, y, z) is a function of the generalized position q. Now, the Lagragian $L(q,\dot{q})$ can be defined as the difference between the kinetic and the potential energy of the system. Thus, $$L(q,\dot{q})=T(q,\dot{q})-V(q) \qquad (1)$$

where T is the kinetic energy and V is the potential energy of the system.

Then, the dynamic equation of the 3D printer can be given as follows:

$$\frac{d}{dt}\left[\frac{\partial L(q, \dot{q})}{\partial \dot{q}}\right] - \frac{\partial L(q, \dot{q})}{\partial q} = \Upsilon \qquad (2)$$

where Y is the external force given as follows:

$$\gamma = \tau - f(\tau,\dot{q}) \qquad (3)$$

where $\tau \in \Re^{n \times 1}$ is the torque produced by each of the stepper motors in the joints, and $f(\tau,\dot{q}) \in \Re^{n \times 1}$ is the friction vector.

The general dynamics equation of the 3D printer can also be written as follows:

$$M(q)\ddot{q}+C(q,\dot{q})\dot{q}+g(q)+f(\tau,\dot{q})=\tau \qquad (4)$$

where $M(q) \in \Re^{n \times 1}$ is an inertial matrix, $C(q,\dot{q}) \in \Re^{n \times n}$ is the torque matrix, and $g(q) \in \Re^{n \times n}$ is the vector gravity torque.

To produce these torques, the current is supplied in the coils of the stepper motors. Considering two phase hybrid stepper motors, the total torque produced by the motor due to the current $i_A$ and $i_B$ passing in the two phases can be calculated as follows:

$$\tau = -p\Psi_m i_A \sin(p\theta) - p\Psi_i i_B \sin(p(\theta-\lambda)) \qquad (5)$$

where $\psi_m$ is the maximum stator flux linkage, p is the number of rotor pole pairs, $\lambda$ is the angle between the two stator windings, and $\theta$ is the mechanical rotational angle. By accurately measuring all the coefficients in Equation 4, the frequency response and the corresponding vibration of the 3D printer system can be measured. However, this is non-trivial and also lacks consideration of mechanical degradation due to an aging effect.

2) Electro-Mechanical Modeling of the 3D Printer

In the dynamic model of the 3D printer, the frequency response of the 3D printer due to the applied torque and the corresponding frequency present in each joint is explained. However, apart from this, the stator of the stepper motor in each of the axis also vibrates due to the fluctuating radial electromagnetic force on the stator. From Maxwell stress tensor, the magnitude of the radial force per unit area can be calculated at any point of the air gap as follows:

$$\sigma = \frac{b_n^2 - b_t^2}{2\mu_o} \qquad (6)$$

where $b_t$ is the tangential air-gap flux density, $b_n$ is radial air-gap flux density, and $\mu_o$ is the permeability of the free space.

The magnetic flux density is the function of current flowing through the stator, number of windings turns in each stator core, magnetic flux path length, etc. These radial forces per unit area can be abstracted and expressed as follows:

$$p_r(\alpha,t)=P_r\cos(r\alpha-\omega_r t) \qquad (7)$$

where r is the order of the force wave, $\omega_r$ is the angular frequency of the force of the $r^{th}$ order, $\alpha$ is the angular distance from the given axis, and $P_r$ is the amplitude of the radial force pressure in N/m².

Each of the stepper motors used in the 3D printer is a source of vibration with its own stator natural frequency expressed as follows:

$$f_r \approx \frac{1}{2\pi}\sqrt{\frac{K_r + K_r^f + K_r^w}{M + M_f + M_w}} \qquad (8)$$

where $K_r$, $K_r^w$, and $K_r^f$ is the lumped stiffness of the stator, tooth-slot zone including winding, and frame where stepper motor is connected, respectively. M, $M_w$, and $M_f$ are the mass of the stator core, winding, and frame, respectively.

Next, assuming the transfer path for various components of the 3D printer to be linear, a transfer path analysis method may be used to determine the sound pressure spectrum at point i due to a force acting upon point j, in direction k as follows:

$$p_{ijk}(\omega)=H_{ijk}F_{jk}(\omega) \qquad (9)$$

where $H_{ijk}$ is the frequency response function between point i and j, $F_{jk}$ is the force spectrum at point j.

Then the sound pressure, only considering the prismatic DOF, at point i is obtained as follows:

$$p_i(\omega) = \sum_{j=1}^{N}\sum_{k=1}^{3} H_{ijk} \cdot F_{jk}(\omega) \qquad (10)$$

Equation 10 becomes complex when considering revolute DOFs. Moreover, calculation of the frequency response function and the fluctuating force itself is non-trivial. This fact points out that it is less strenuous to use data-driven model to estimate the sound production.

B. Data-Driven Leakage and Adversary Model

In the adversary model, it is assumed that there are M side-channels from which an attacker can acquire the leakage information. The G-code is the sensitive variable that an attacker seeks to extract from the 3D printer. Let G represent the sensitive discrete random variable, with probability distribution function p(g), where $g_1, g_2, \ldots, g_k$ represents the possible G-code instructions. Then, the information leakage from each channel i, can be represented by a leakage signal L as follows:

$$L_i=\delta_i(G)+N_i, \; i=1,2,\ldots,M \qquad (11)$$

where $N_i$ denotes an independent noise (independent from the variable G) in the $i^{th}$ channel, $\delta(.)$ represents the deterministic function, and $L_i$ is the leakage in the $i^{th}$ channel.

Moreover, for each G-code instruction $g_k$, the corresponding leakage may be given as follows:

$$l_{(i,k)}=\delta_i(g_k)+n_{(i,k)} \; k=1,2,\ldots,K \qquad (12)$$

where $n_{(i,k)}$ represents the leakage noise value in the $i^{th}$ channel for the $k_{th}$ leakage measurement, and K is the total number of G-code instructions.

To breach the confidentiality of the system, an attacker measures leakages $l_{(i,k)}$ from m side-channels for all the G-code instructions used to print a 3D object. The attacker will apply a leakage model function $f(l_{(i,k)})$ to estimate the G-code instruction $\hat{g}_k=f(l_{(1,k)}, l_{(2,k)}, \ldots, l_{(M,k)})$. There are two phases for an attacker. The first one is the training phase, where the attacker acquires the information leakage from M channels using various sensors and test objects. Then the leakage model function is estimated as $\hat{f}(.,\alpha)$, where $\alpha$ is the tuning parameter for the function. In the second phase, leakage for real objects are gathered and the original G-code is extracted using the estimated functions. Various statistical tools can be used to model the leakage model function $\hat{f}_i(.,\alpha)$, such that $$i = \mathrm{argmin}_{1\le i\le N}\sum_{k=1}^{K}\left|g_k - \hat{f}_i(\cdot,\alpha)\right| \qquad (13)$$

where N is the total leakage model function the attacker can estimate. The accuracy of the estimated function depends on the amount of information leaked about G in the side-channels.

Mutual information is used as a metric to quantify the information leakage from each of the channels. Given the joint probability distribution function $p(g,l_i)$ and the marginal probability distribution p(g) and $p(l_i)$ for the discrete random variables G and $L_i$, the mutual information between the G-code instruction and the leakage can be calculated as follows:

$$I(G;L_i) = \sum_{l_i\in L_i}\sum_{g\in G} p(g,l_i)\log_2\!\left(\frac{p(g,l_i)}{p(g)p(l_i)}\right) \qquad (14)$$

Since base 2 has been used for the logarithm, the unit of the mutual information is bits. Using Equation 14, the leakage of information can be quantified in each side-channel separately.

C. Formulation of Leakage Aware Optimization Problem

Figure 2:
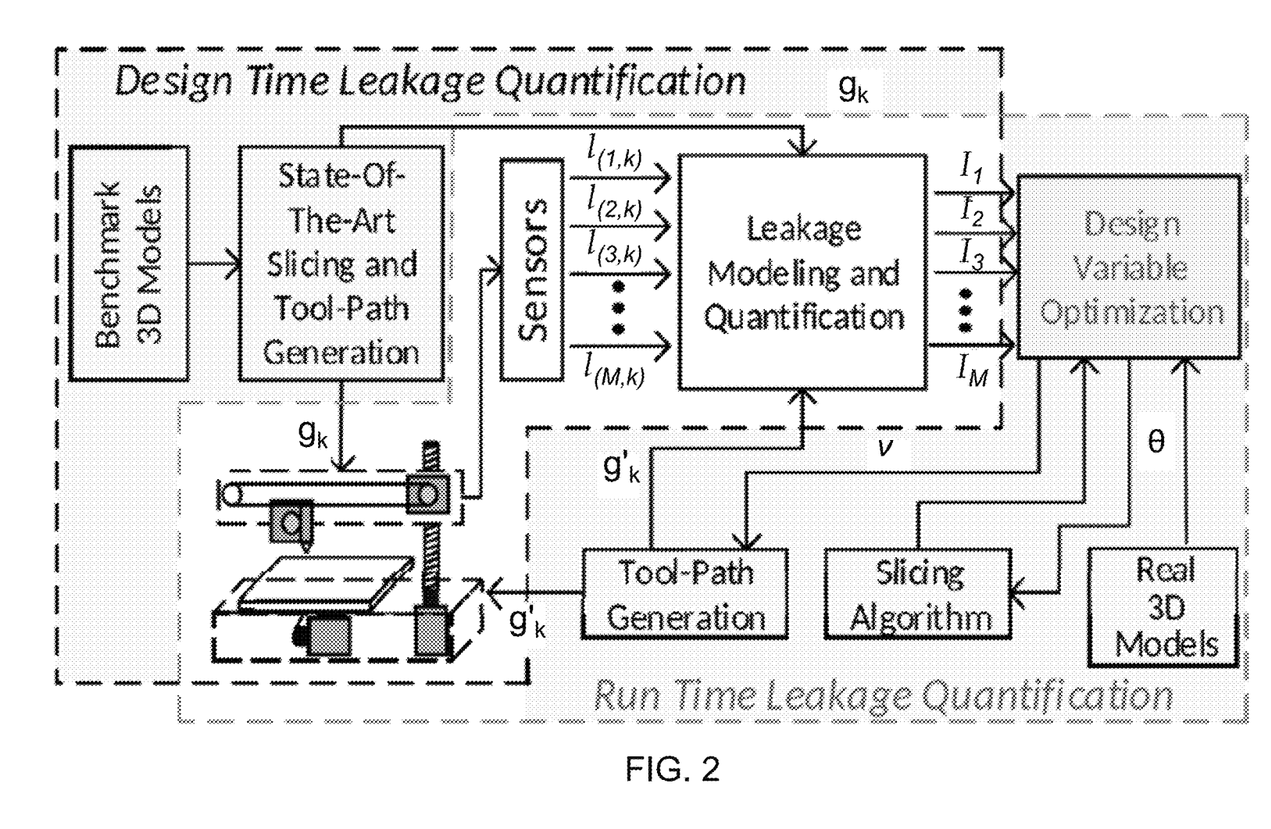
FIG. 2 shows an exemplary embodiment of the leakage model and security aware optimization algorithm.

The data-driven leakage modeling for quantifying the information leakage (as shown in FIG. 2) may be done in two stages: design-time leakage quantification and run-time leakage quantification.

1) Design-Time Leakage Quantification

During the design phase, a manufacturer can use the data-driven leakage model to measure the mutual information between the various signals leaked from the side-channels and the G-code acquired from the benchmark 3D models used for testing the quality of the printer. This mutual information can then be used to optimize the design variables. This type of quantification is only done once, and 3D printer users need not perform the leakage quantification.

2) Run-Time Leakage Quantification

The components in the physical domain continuously go through the process of degradation. These degradation can have both positive or negative impacts on the mutual information. In scenarios where these degradation increase the mutual information, the design variables have to be optimized again for minimizing the leakage. Hence, run-time leakage quantification is necessary to make sure that the environmental condition and aging of the physical system do not aid in the leakage of the information.

Based on the physics-based leakage model of the 3D printer, two design variables are proposed that can be used to minimize the amount of leakage from the acoustic side-channel as detailed in *Fix the Leak! An Information Leakage Aware Secured Cyber-Physical Manufacturing System*, Chhetri, et. al., which is incorporated herein in its entirety.

Optimization Problem Statement

For minimizing the information leakage from acoustic side-channel, a new leakage aware algorithm is proposed. In this example, design variables are defined as, $0 \leq \theta \leq 2\pi$, and $v = \sqrt{v_x^2 + v_y^2}$. Where $v_x \in \Re$, and $v_y \in \Re$. For the speed in x and y axis, there are two variable bounds, $v_{x\,min} \leq v_x \leq v_{x\,max}$ and $v_{y\,min} \leq v_y \leq v_{y\,max}$, where $v_{x\,min}$ and $v_{y\,min}$ are the minimum machine specific travel feed-rate in x and y axis respectively, and $v_{x\,max}$ and $v_{y\,max}$ are the maximum machine specific travel feed-rate in x and y axis respectively. A simple constraint is applied such that $T \leq kT_{original}$, where $T_{original}$ is the printing time of the state-of-the-art slicing and tool-path generation algorithm, and $k \geq 1$ is the user defined constant. The leakage functions in fact, estimate the joint probability distribution $p(g, l_i)$ present in the equation 14, and for simplicity an estimation function that gives the relation between the design variables and the analog emissions are defined as $\hat{f}_\theta(., \alpha_\theta)$ and $\hat{f}_V(., \alpha_v)$. Based on these functions, the mutual information between the G-code and the leakage signal $I_{\theta_i}(G; L_i)$ and $I_{v_i}(G; L_i)$ can be calculated. Using a non-linear polynomial functions $f_{\theta_i}(I_{\theta_i}, \theta_i)$ and $f_{v_i}(I_{v_i}, v_i)$, the relation between the mutual information and the design variables can be estimated in different side-channels. Then the multi-objective optimization function can be given as follows:

$$(\theta, v) = \arg_{(\theta,v)} \min(f_{\theta 1}, f_{\theta 2}, \ldots, f_{\theta M}, f_{v1}, f_{v2}, \ldots, f_{vM}) \quad (15)$$

Based on the value given by the optimized design variable, slicing and tool-path generation will generate new G-code with minimum information leakage.

---

Algorithm 1: Leakage Aware G-code Generation.

Input: Estimated Functions $\hat{f}_\theta(., \alpha_\theta)$, $\hat{f}_v(., \alpha_v)$, STL File
Output: G-code g'
1 Define step size $\Delta_\theta$, $\Delta_v$ and range $\min_\theta$, $\min_v$ and $\max_\theta$, $\max_v$
2 for i = 1 : M do
3    for each j ∈ (θ, υ) do
4      for k = $\min_j$ :$\Delta_j$: $\max_j$ do
5        $I_{(j_i, k)} = I_k(G; L_i)$    // Based on $\hat{f}_j(., \alpha_j)$
6    Estimate Nonlinear function $f_{j_i}$
7 Optimize $\arg \min_{(\theta, v)}$ ($f_{\theta 1}$, $f_{\theta 2}$, ..., $f_{\theta M}$, $f_{v 1}$, $f_{v 2}$, ..., $f_{v M}$)
8 g' = SliceandToolPathGeneration(θ, υ, STL File)
9 return g'

---

In Algorithm I, functions estimated by collecting the leakage and the G-code data while printing the benchmark 3D models are passed to the algorithm. Then in line 1, first the step size for estimating the cost function based on the design variables θ, v are defined, along with their range. Then from line 2 to 6, using the functions $\hat{f}_\theta(., \alpha_\theta)$, $\hat{f}_V(., \alpha_v)$, various mutual information values are calculated for the varying design variables. In line 6, a polynomial function is used to estimate the relation between the design variables and the mutual information calculated in line 5. Then, based on the description of the problems statement, mixed multi-objective non-linear integer programming is used to optimize the design variables. In line 8, the modified design variables are passed to the slicing and tool-path generation function to generate a G-code with minimum leakage, which is finally returned in line 9.

Experimental Results

Figure 3:
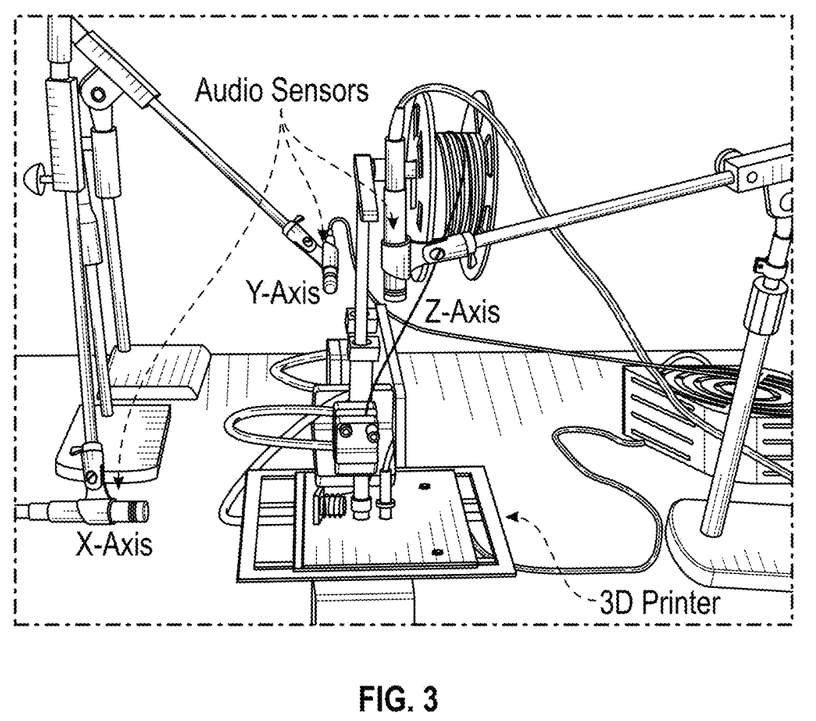
FIG. 3 shows the experimental set up of the present invention.
Figure 4A:
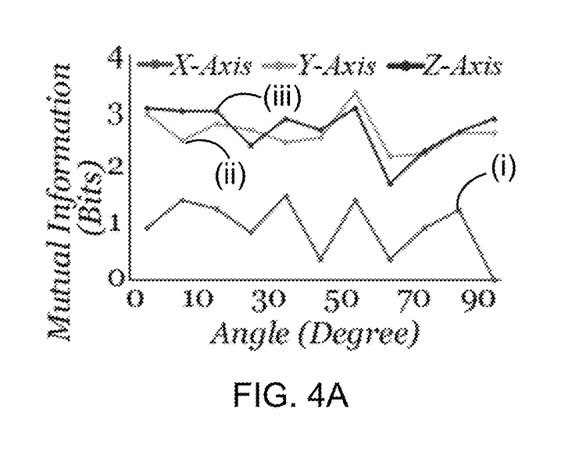
FIGS. 4A-4C shows the mutual information between angle and leakage with a total angle entropy of 3.4594 bits using Principal Component 1 (FIG. 4A), Principal Component 2 FIG. 4B, and Principal Component 3 (FIG. 4C).
Figure 4B:
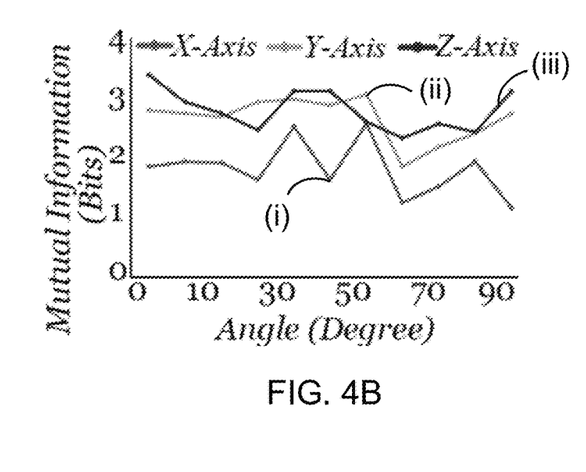
Figure 4C:
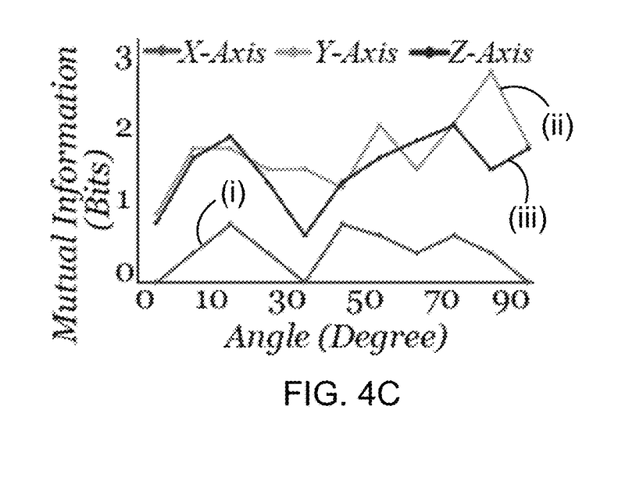
Figure 4D:
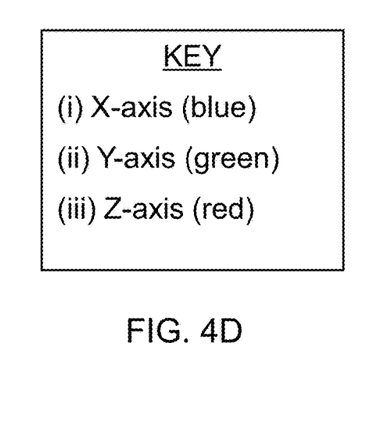
FIG. 4D is a key for FIGS. 4A-4C.

As a non-limiting example, the experimental setup shown in FIG. 3 comprises a fused deposition modeling based desktop 3D printer. Three AT2021 cardioid condenser audio sensors were placed in parallel to the x, y, and z-axis, respectively and treated as individual channels. Hence, M=3. In order to calculate the mutual information, the raw leakage signal with higher sampling rate may not result in good description of the signal. Hence, the power spectral density of the audio signal was calculated and the three principal components were used to represent the mutual information.

A. Mutual Information

Design Variable—θ

Design variable θ was varied from 0° to 90° with the step size $\Delta_\theta = 10°$. Based on the data collected joint probability function $p(\theta, l_i)$ is estimated and used in calculating the mutual information using Equation 14.

In FIG. 4, three principal components and the curve representing the estimation of the mutual information variation corresponding the θ is presented. It can be seen that for audio signals placed in z-axis and y-axis the mutual information is lower when the nozzle movement is not parallel to x or y-axis. However, for x-axis, the mutual information is the least when the angle 90°. This may be due to the fact that when the angle is parallel to y-axis, the audio signal captured by the audio sensor does not have much variation.

Design Variable—v

Figure 5A:
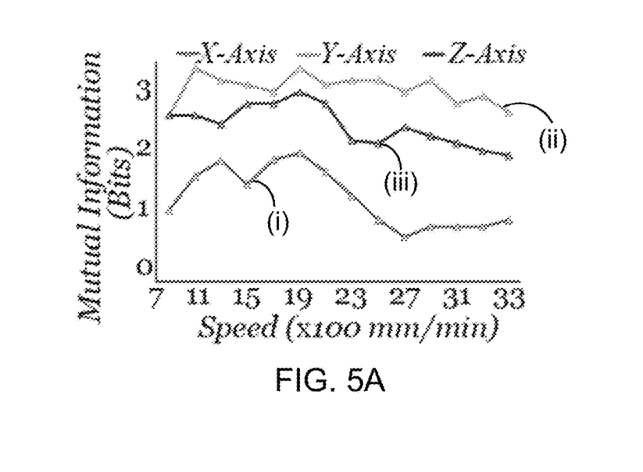
FIGS. 5A-5C show the mutual information between speed and leakage with a total speed entropy of 3.8074 bits using Principal Component 1 (FIG. 5A), Principal Component 2 FIG. 5B, and Principal Component 3 (FIG. 5C).
Figure 5B:
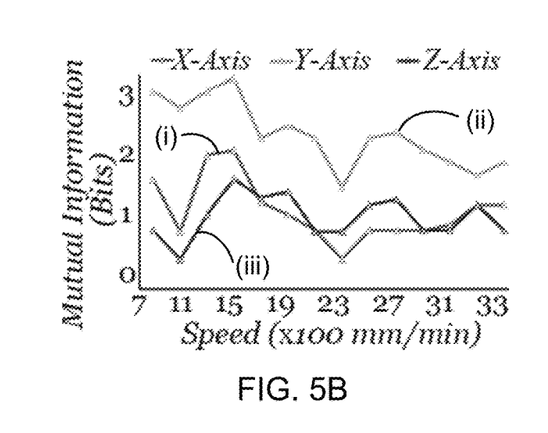
Figure 5C:
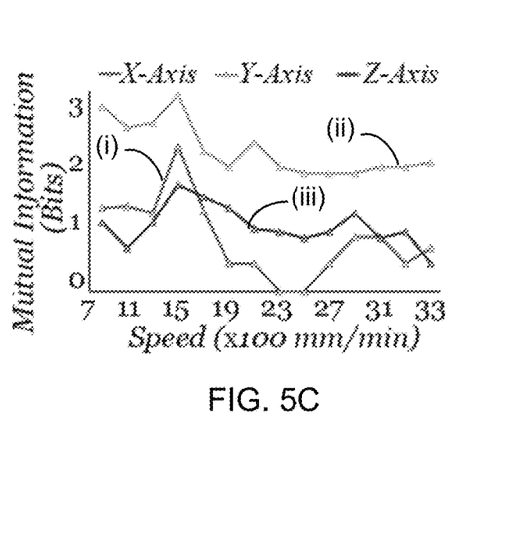
Figure 5D:
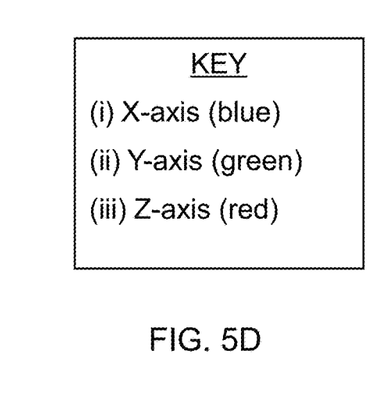
FIG. 5D is a key for FIGS. 5A-5C.
Figure 6:
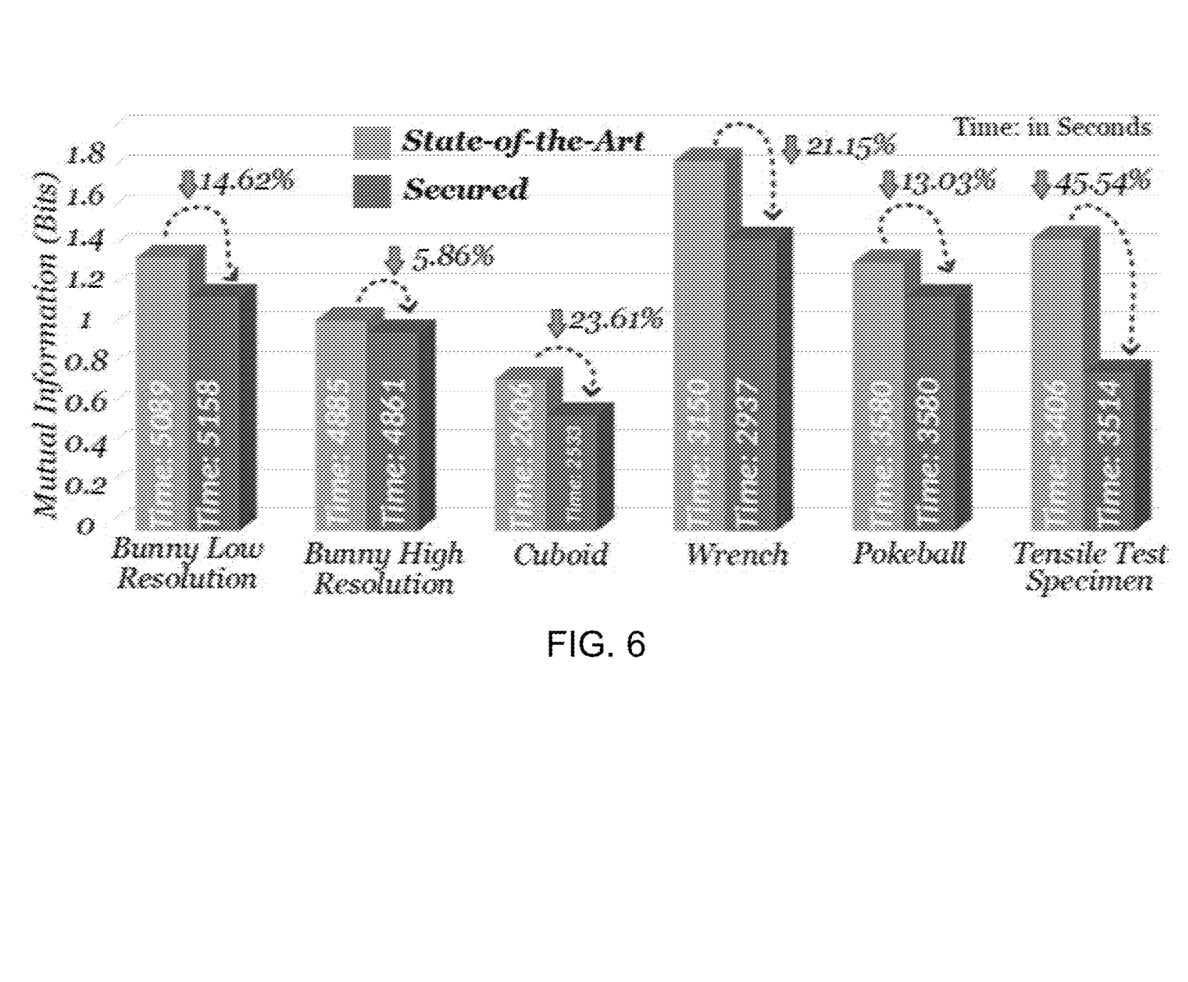
FIG. 6 shows mutual information for benchmark 3D models.
Figure 7:
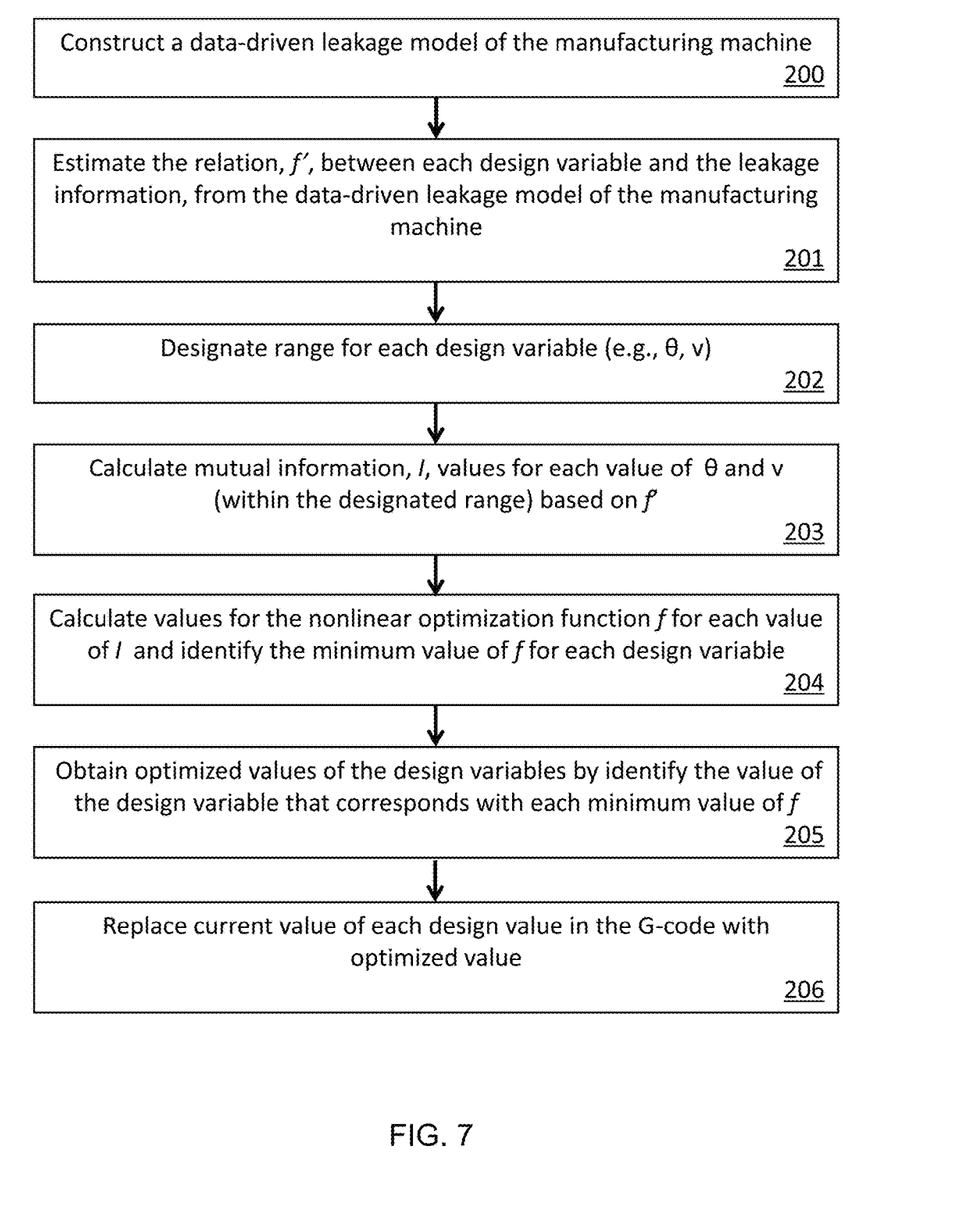
FIG. 7 shows a flowchart of an exemplary protocol for the present invention.

The travel feedrate was varied from 700 mm/min to 3300 mm/min with the step size $\Delta_v = 200$ mm/min. In FIG. 5, the mutual information between the three principal components of the power spectral density and the varying travel feedrate was presented. As expected, it can be observed that for all the audio signals collected, the mutual information is higher during slower travel feed-rate and lower for the faster travel feedrate.

B. Test with Benchmark 3D Models

Benchmark models that are easily available and used for testing the 3D printer's performance have been selected. These models include a Stanford bunny in high and low resolution, a simple cuboid, a mini wrench, a pokeball, and a tensile test specimen in the shape of a dogbone. It can be seen in Table I that with the optimized design variable, the mutual information between the G-code and the acoustic leakage have dropped for all the signals collected by the microphones placed parallel to each of the axis. Moreover, the average mutual information across all the audio signals is presented in FIG. 6.

TABLE I

MUTUAL INFORMATION BETWEEN G-CODE OF AND ACOUSTIC SIGNAL.

| Audio Sensor Parallel To | Mutual Information (Bits) | | | | | | | |
|---|---|---|---|---|---|---|---|---|
| | X-Axis | | Y-Axis | | Z-Axis | | Average of Axes | |
| | Unsecured | Secured | Unsecured | Secured | Unsecured | Secured | Unsecured | Secured |
| Bunny (High Res.) | 1.1496 | 0.9146 | 1.6849 | 1.5413 | 1.3600 | 1.1354 | 1.3982 | 1.1937 |
| Bunny (Low Res.) | 0.8315 | 0.8187 | 1.3290 | 1.2014 | 1.0676 | 1.0186 | 1.0760 | 1.0129 |
| Cuboid | 0.6506 | 0.4674 | 0.8605 | 0.7891 | 0.8156 | 0.5209 | 0.7756 | 0.5924 |
| Mini Wrench | 1.6902 | 1.2726 | 2.0038 | 1.8932 | 1.9703 | 1.3002 | 1.8881 | 1.4887 |
| Pokeball | 1.0236 | 0.9055 | 1.8129 | 1.5461 | 1.2792 | 1.1275 | 1.3719 | 1.1930 |
| Tensile Specimen | 1.3344 | 0.7839 | 1.9658 | 0.9302 | 1.1737 | 0.7223 | 1.4913 | 0.8121 |

The models that have smaller line segments (cuboid) and more curves (bunny with high resolution) have lower mutual information in the acoustic side-channel compared to the others. Moreover, the tensile test specimen, which has longer line segments, had the highest mutual information reduction of 45.54% when the speed and angle was optimized for it. It can be seen that compared to the unsecured G-code generated from the slicing and tool-path generation, the secured approach of the present invention reduces the mutual information for all the 3D models. From FIG. 6, the average drop in mutual information for the benchmark models is 24.76%. Furthermore, the secured G-code only increased the average printing time for all the models by 0.58%.

II. Physical Encryption System for AM Systems

Figure 9:
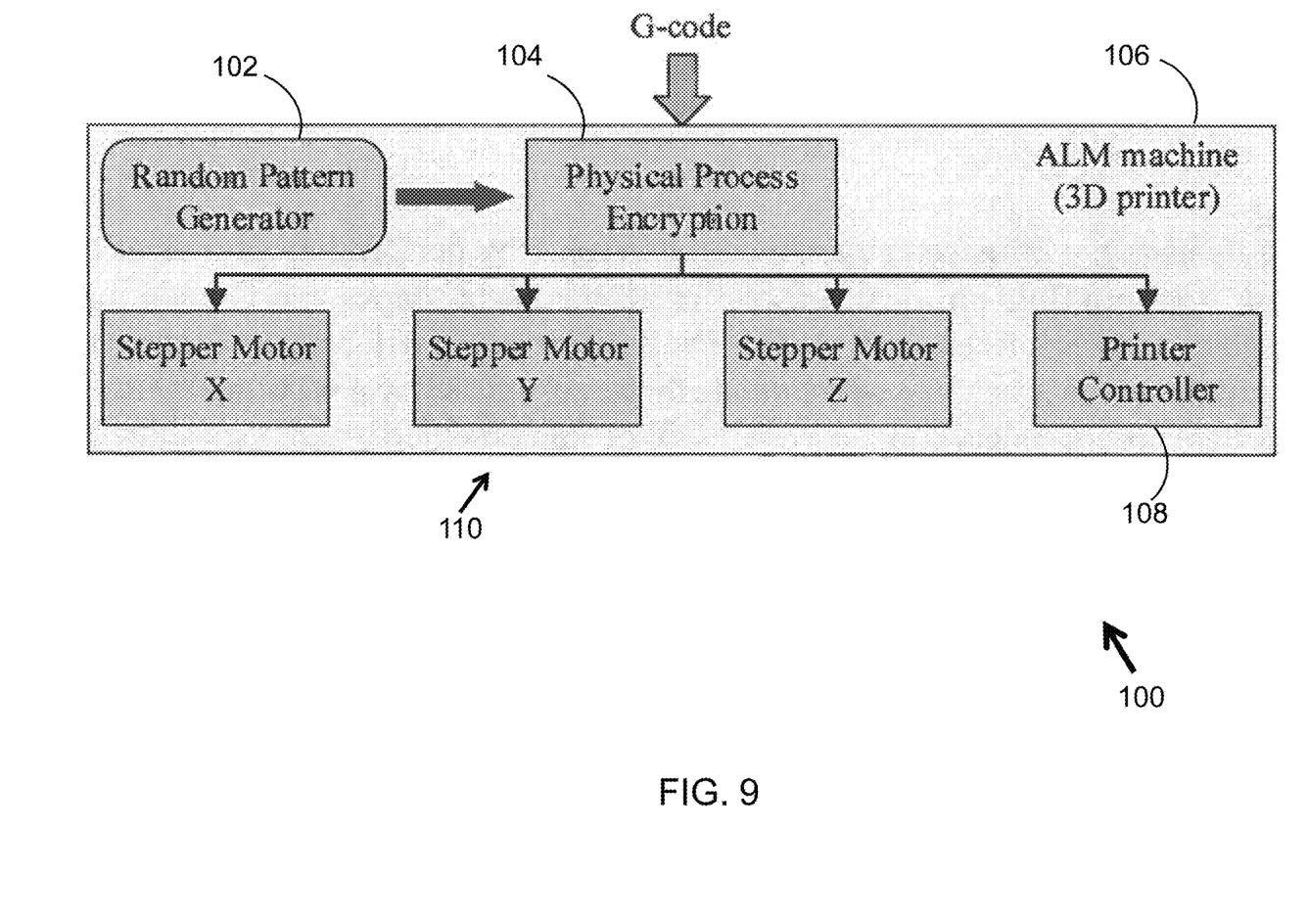
FIG. 9 shows the proposed defense system integrated into a 3D printer.

Referring now to FIGS. 8A-9, the present invention further features a machine-dependent physical process encryption system (100) for defending an AM system against a side channel attack. The AM system may comprise a cyber domain and a physical domain having a manufacturing machine (106). A typical product lifecycle management of the AM system is presented in FIG. 8A-8B. Designers usually start design of 3D models by non-manufacturing 3D modeling tools. Next, a computer-aided ("CAD") design process is involved to generate standard stereolithography ("STL") for manufacturing purposes. For AM, a computer-aided manufacturing process is required to slice the STL file into layer-by-layer descriptions (e.g. G-code, cube, etc.). Then the layer description file will be sent to the manufacturing machine for production. It is hypothesized that during the lifecycle of the AM system, the IP information contained by the 3D model, the STL files, and the layer description files in the cyber domain can be recovered/reconstructed through attacks occurred during the manufacturing process in the physical domain through various non-intrusive techniques (e.g. by load monitoring, temperature profile analysis, analyzing acoustic information, tracking nozzle motion, and capturing and analyzing electromagnetic emissions).

In some embodiments, the encryption system (100) is machine-dependent and uses G-code as input to the machine (106) in order to construct a 3D model via a printing process. As mentioned earlier, a side channel attack occurs when an attacker acquires analog emissions emanating from the machine (106) during the printing process. An attacker would process and analyze the emissions in order to extract the G-code and reproduce the 3D model.

In further embodiments, the encryption system (100) may comprise a random pattern generator (102) whose output comprises a plurality of random patterns that are machine-dependent redundant physical information. A physical process encryption module (104), operatively coupled to the random pattern generator (102), may also comprise the system. The physical process encryption module (104) uses the output of the random pattern generator (102) to encrypt the physical printing process. In further embodiments, the physical process encryption module (104) may comprise a memory for storing a plurality of encryption schemes and a processor, operatively coupled to the memory. The processor may be configured to use the output of the random pattern generator to execute the plurality of encryption schemes for encrypting the physical printing process (102).

In supplementary embodiments, a printer controller (108) may be operatively coupled to the physical process encryption module (104). Additionally, one or more stepper motors (110), may each be operatively coupled to the physical process encryption module (104) and the printer controller (108).

Consistent with previous embodiments, the G-code may be passed from the cyber domain to the physical process encryption module (104) and the plurality of random patterns may be passed from the random pattern generator (102) to the physical process encryption module (104). This module (104) may encrypt the physical printing process by embedding the plurality of random patterns into the G-code according to an encryption scheme. The G-code may then transmitted to the printer controller (108) for physical execution, thus the machine-dependent redundant physical information is incorporated into the printing process.

In further embodiments, the machine-dependent redundant physical information may comprise a randomization of a movement of each stepper motor, where each randomization may be embedded as additional lines of code into the G-code. Upon execution of the G-code, each randomization moves the associated stepper motor accordingly. In this way, random noise is generated in the analog emissions emanating from the manufacturing machine (106) thus encrypting the physical printing process. The machine-dependent redundant physical information may also comprise a plurality of random delays, where each random delay is added in between the lines of code comprising the G-code. Whereupon execution of the G-code, analog emissions emanating from the machine (106) deviate from the analog emissions that would result without the random delays. The physical printing process is thus encrypted, rendering G-code extracted by the attacker ineffective for reproducing the 3D model.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of reducing an information leakage from one or more side channels of an additive manufacturing ("AM") system, wherein the AM system comprises a manufacturing machine (106) that prints a 3D model by executing a G-code having a plurality of design variables, wherein the information leakage comprises analog emissions emanating from the one or more side channels during printing of the 3D model, wherein an attacker acquires and analyzes the information leakage to extract the G-code, wherein the method comprises:
   a. determining an estimation function, f', from a data-driven leakage model of the manufacturing machine (106) for each design variable (201), wherein the manufacturing machine is initially ran to print a sample 3D model, thereby acquiring the analog emissions from the one or more side channels, wherein the estimation function f' provides a relationship between each design variable and a corresponding analog emission, wherein the estimation function f' is determined by a statistical tool that compares each design variable to the corresponding analog emission;
   b. selecting, from the plurality of design variables, one or more design variables to optimize for the one or more side channels;
   c. calculating a mutual information metric (203) between the G-code and the information leakage for each of the one or more selected design variables, wherein the mutual information metric is used as feedback by the AM system to optimize the one or more selected design variables to effectively minimize further information leakage,
      wherein the information leakage is represented by a leakage signal L at side channel i as:

$L_i = \delta_i(G) + N_i$, where i=1 to total number of side channels, where $N_i$ denotes independent noise in channel i, G is the G-code comprising a set $(g_1, g_2, \ldots g_k)$ of length k, where each g in the set is a discrete random variable that represents a possible G-code instruction, and $\delta_i(G)$ represents a deterministic function,
      wherein the mutual information metric between the G-code and the information leakage in side channel i is calculated for each of the one or more selected design variables as:

$$I(G; L_i) = \sum_{l_i \in L_i} \sum_{g \in G} p(g, l_i) \log_2 \left( \frac{p(g, l_i)}{p(g)p(l_i)} \right)$$

wherein l is a corresponding leakage of g, and p is a probability distribution function, wherein $p(g, l_i)$ is estimated by the estimation function f' for each of the one or more selected design variables;
   d. calculating a relation between the mutual information metric and each of the one or more selected design variables (204) using a non-linear polynomial function, f, given as:

f(selected design variable)=summation of ($I_i$)

e. obtaining an optimized value (205) from f for each of the one or more selected design variables; and
   f. inserting the optimized value of each of the one or more selected design variables into the G-code (206), thereby replacing a current value of each of the one or more selected design variables with the optimized value;
   wherein when the optimized value of each of the one or more selected design variables is inserted into the G-code, further information leakage from the one or more side channels is minimized, thus diminishing the attacker's ability to process the analog emissions and extract the G-code.

2. The method of claim 1 further comprising constructing the data-driven leakage model of the manufacturing machine (200).

3. The method of claim 1 further comprising designating a user defined range (202) for each of the one or more selected design variables, wherein the mutual information metric is calculated for a plurality of possible values within the user defined range.

4. The method of claim 1, wherein the optimized value is obtained by selecting a corresponding minimum f (204) for each of the one or more selected design variables.

5. An encryption system (100) for reducing an information leakage from one or more side channels of an additive manufacturing ("AM") system, wherein the AM system comprises a manufacturing machine (106) that prints a 3D model by executing a G-code having a plurality of design variables, wherein the information leakage comprises analog emissions emanating from the one or more side channels during printing of the 3D model, wherein an attacker acquires and analyzes the information leakage to extract the G-code, wherein the system comprises:
   a. a processor operatively coupled to the manufacturing machine; and
   b. a memory operatively coupled to the processor, configured to store digitally-encoded instructions that, when executed by processor (108), cause the processor to perform operations comprising:
      i. determining an estimation function, f', from a data-driven leakage model of the manufacturing machine (106) for each design variable (201), wherein the manufacturing machine is initially ran to print a sample 3D model, thereby acquiring the analog emissions from the one or more side channels, wherein the estimation function f' provides a relationship between each design variable and a corresponding analog emission, wherein the estimation function f' is determined by a statistical tool that compares each design variable to the corresponding analog emission;

ii. selecting, from the plurality of design variables, one or more design variables to optimize for the one or more side channels;

iii. calculating a mutual information metric (203) between the G-code and the information leakage for each of the one or more selected design variables, wherein the mutual information metric is used as feedback by the AM system to optimize the one or more selected design variables to effectively minimize further information leakage, wherein the information leakage is represented by a leakage signal L at side channel i as:

$L_i = \delta_i(G) + N_i$, where i=1 to total number of side channels, where $N_i$ denotes independent noise in channel i, G is the G-code comprising a set $(g_1, g_2, \ldots g_k)$ of length k, where each g in the set is a discrete random variable that represents a possible G-code instruction, and $\delta_i(G)$ represents a deterministic function, wherein the mutual information metric between the G-code and the information leakage in side channel i is calculated for each of the one or more selected design variables as:

$$I(G; L_i) = \sum_{l_i \in L_i} \sum_{g \in G} p(g, l_i) \log_2 \left( \frac{p(g, l_i)}{p(g)p(l_i)} \right)$$

wherein l is a corresponding leakage of g, and p is a probability distribution function, wherein $p(g, l_i)$ is estimated by the estimation function f' for each of the one or more selected design variables iv. calculating a relation between the mutual information metric and each of the one or more selected design variables (204) using a non-linear polynomial function, f, given as:

$f$(selected design variable)=summation of $(I_i)$ v. obtaining an optimized value (205) from f for each of the one or more selected design variables; and vi. inserting the optimized value of each of the one or more selected design variables into the G-code (206), thereby replacing a current value of each of the one or more selected design variables with the optimized value;

wherein when the optimized value of each of the one or more selected design variables is inserted into the G-code, further information leakage from the one or more side channels is minimized, thus diminishing the attacker's ability to process the analog emissions and extract the G-code.

6. The system of claim 5, wherein the operation further comprises constructing the data-driven leakage model of the manufacturing machine (200).

7. The system of claim 5, wherein the operation further comprises designating a user defined range (202) for each of the one or more selected design variables, wherein the mutual information metric is calculated for a plurality of possible values within the user defined range.

8. The system of claim 5, wherein the optimized value is obtained by selecting a corresponding minimum f (204) for each of the one or more selected design variables.

* * * * *